C. H. STEVENS.
SHOCK ABSORBING DEVICE.
APPLICATION FILED OCT. 28, 1911.

1,051,773.

Patented Jan. 28, 1913.

WITNESSES
R. C. Braddock
Emory L. Groff

INVENTOR
Charles Henry Stevens
By D. T. Hochhaupter
His Attorney

UNITED STATES PATENT OFFICE.

CHARLES HENRY STEVENS, OF WIMBLEDON, ENGLAND.

SHOCK-ABSORBING DEVICE.

1,051,773.  Specification of Letters Patent.  Patented Jan. 28, 1913.

Application filed October 28, 1911.  Serial No. 657,371.

*To all whom it may concern:*

Be it known that I, CHARLES HENRY STEVENS, a subject of the King of Great Britain and Ireland, and resident of Wimbledon, Surrey, England, have invented certain new and useful Improvements in Shock-Absorbing Devices, of which the following is a specification.

This invention relates to an anti-vibrator and shock-absorbing device interposed between and in the length of the parts forming the handle-bar stem, means being provided to maintain the connection of the parts and to prevent them from twisting relatively to one another, and the present invention is directed to that type of handle-bar having the ordinary tubular stem brazed or rigidly secured thereto.

In carrying out the present invention, reference is had to the accompanying sheet of drawings in which—

Figure 1:
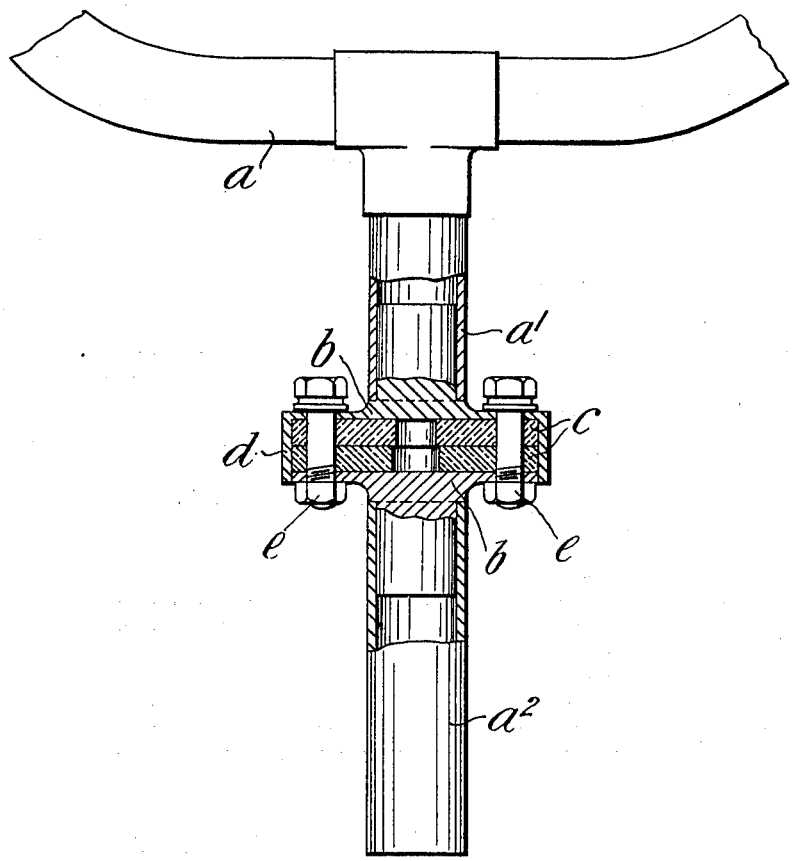
Figure 2:
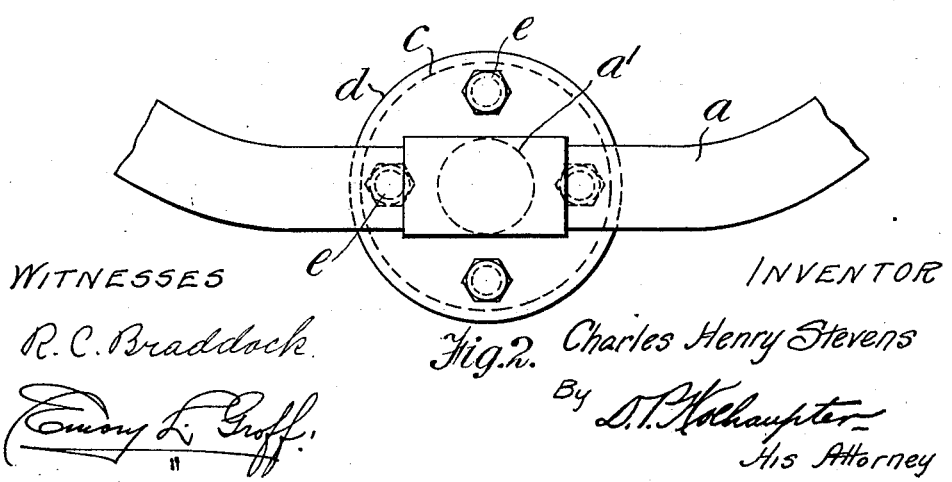

Figure 1 is a front elevation partly in section, and Fig. 2 a plan view.

The stem of the handle-bar $a$ is divided into two parts $a'$, $a^2$, the adjacent ends of which are each provided with a flange $b$ between which is interposed the cushioning or shock-absorbing medium which may consist, as shown, of a rubber pad or pads $c$, but elastic material other than rubber or a compression spring or springs may be employed in lieu thereof. The cushioning or shock-absorbing medium $c$ is preferably—but not necessarily—surrounded and protected by a downwardly extending side wall or flange $d$ and may or may not be cut away at the center thereof, while the two parts $a'$, $a^2$ are prevented from twisting relatively to one another in any suitable manner, as by means of bolts and nuts $e$, said bolts passing through the top flange, cushioning medium and lower flange as shown, thus effecting the connection of the two parts together.

Having now described my invention, what I claim as new and desire to secure by Letters Patent of the United States is:—

1. In a shock-absorbing device a steering post comprising two sections, one section having an enlarged end portion, the other having a cup-shaped portion adapted to fit over the enlarged end portion of the other section, a cushioning medium interposed between the two sections, and housed by the said cup-shaped portion, and means for securely fastening the two sections together to prevent rotary movement thereof.

2. A shock-absorbing device applicable to hollow steering posts, comprising two members, each having a portion adapted to fit within a section of a hollow steering post and adapted to be secured thereto, one of said members having an enlarged top portion, the other of said members having a cup-shaped portion adapted to fit over the enlarged top portion of the other section, a cushioning medium interposed between the two sections, and housed by the said cup-shaped portion, and bolts for securely fastening the two members together to prevent rotary movement thereof.

3. A shock-absorbing device for motor cycles and the like comprising a steering post consisting of two sections, a cushioning medium interposed between said sections, and means for securely fastening the said sections together.

In testimony whereof I have affixed my signature in presence of two witnesses.

CHARLES HENRY STEVENS.

Witnesses:
ROBERT HUNTER,
EDWIN CHARLES AXE.

---

Copies of this patent may be obtained for five cents each, by addressing the "Commissioner of Patents, Washington, D. C."